US009528585B2

(12) United States Patent
Taylor

(10) Patent No.: US 9,528,585 B2
(45) Date of Patent: Dec. 27, 2016

(54) PISTON ENGINE

(71) Applicant: Northern Alberta Institute of Technology, Edmonton (CA)

(72) Inventor: Peter Ross Taylor, Edmonton (CA)

(73) Assignee: Peter Ross Taylor, Ardrossan, Alberta (CA)

( * ) Notice: Subject to any disclaimer, the term of this patent is extended or adjusted under 35 U.S.C. 154(b) by 463 days.

(21) Appl. No.: 13/930,562

(22) Filed: Jun. 28, 2013

(65) Prior Publication Data

US 2014/0000550 A1  Jan. 2, 2014

Related U.S. Application Data

(60) Provisional application No. 61/666,767, filed on Jun. 29, 2012.

(51) Int. Cl.
| | |
|---|---|
| *F16H 37/12* | (2006.01) |
| *F02B 75/26* | (2006.01) |
| *F01C 9/00* | (2006.01) |
| *F01C 17/02* | (2006.01) |
| *F16H 35/00* | (2006.01) |

(52) U.S. Cl.
CPC ............ *F16H 37/122* (2013.01); *F01C 9/002* (2013.01); *F01C 17/02* (2013.01); *F02B 75/265* (2013.01); *F16H 2035/003* (2013.01); *Y02T 10/17* (2013.01); *Y10T 74/18056* (2015.01)

(58) Field of Classification Search
CPC  F16H 37/122; F16H 2720/02; F16H 2720/04; F01C 9/002; F01C 17/02; F02B 75/265; F02B 53/14; F02B 2730/00; F02B 2730/03

USPC .............................. 123/18 A, 18 R, 241, 245
See application file for complete search history.

(56) References Cited

U.S. PATENT DOCUMENTS

| | | |
|---|---|---|
| 309,734 A | 12/1884 | Oehlmann |
| 1,094,794 A | 4/1914 | Kemper et al. |
| 1,298,838 A | 4/1919 | Weed |
| 1,452,125 A | 4/1923 | Pont |
| 1,603,630 A | 10/1926 | Howard |
| 1,892,474 A | 12/1932 | Satrum |

(Continued)

OTHER PUBLICATIONS

"Non circular planetary gears", GT40S.com [online], http://www.gt40s.com/forum/paddock/31688-non-circular-planetary-gears, accessed Feb. 6, 2012.

(Continued)

*Primary Examiner* — Hung Q Nguyen
(74) *Attorney, Agent, or Firm* — Anthony R. Lambert

(57) ABSTRACT

A piston system comprises a first arm and a second arm, each mounted respectively on a first shaft and a second shaft, and being mounted for rotational oscillation about a central axis. Both arms terminate radially outward from the central axis, and are coupled to piston arrangements. The piston arrangements include pistons. Each set of pistons is mounted for movement within respective stationary chambers. Each stationary chamber may be defined, at least in part, by a piston coupled to the first arm and a piston coupled to the second arm. The stationary chambers are arranged about the central axis. The first and the second shaft are connected to an energy transfer mechanism. An energy transfer mechanism includes coupled non-circular gears arranged to convert oscillatory rotational motion to unidirectional rotational motion.

25 Claims, 11 Drawing Sheets

(56) References Cited

U.S. PATENT DOCUMENTS

| | | |
|---|---|---|
| 1,946,136 A | 2/1934 | Farley |
| 2,897,765 A | 8/1958 | Kitano |
| 3,034,486 A | 5/1962 | Buxton |
| 2,301,667 A | 11/1962 | Lutz |
| 3,203,405 A | 8/1965 | Sabet |
| 3,473,414 A | 10/1969 | Shachter |
| 3,580,228 A | 5/1971 | Rocha |
| 3,730,654 A | 5/1973 | McMahon |
| 3,769,946 A | 11/1973 | Scherrer |
| 4,844,708 A | 7/1989 | Lopez |
| 4,870,869 A | 10/1989 | Nagatani |
| 5,083,539 A | 1/1992 | Cornelio |
| 5,222,463 A | 6/1993 | Farrell |
| 5,305,716 A * | 4/1994 | Huttlin ............... F01C 1/44 123/18 R |
| 5,363,813 A * | 11/1994 | Paarlberg ............. B60K 6/24 123/18 R |
| 5,560,324 A * | 10/1996 | Howard ............... F01C 9/002 123/18 A |
| 5,996,538 A | 12/1999 | Rocha et al. |
| 6,289,867 B1 | 9/2001 | Free |
| 6,457,451 B1 | 10/2002 | Sakita |
| 6,691,647 B2 | 2/2004 | Parker |
| 6,739,307 B2 | 5/2004 | Morgado |
| 6,880,494 B2 | 4/2005 | Hoose |
| 6,886,527 B2 | 5/2005 | Regev |
| 7,284,373 B1 * | 10/2007 | Benson ............... F01B 29/10 60/524 |
| 7,415,962 B2 | 8/2008 | Reisser |
| 7,563,086 B2 | 7/2009 | Huttlin |
| 7,600,490 B2 | 10/2009 | Reisser |
| 7,631,632 B2 | 12/2009 | Arov |
| 2011/0271830 A1 * | 11/2011 | Sole ............... F01C 9/002 92/120 |

OTHER PUBLICATIONS

Litvin, F.L., et al., "Noncircular Gears: Design and Generation", Cambridge University Press, pp. vii-x. Month unknown, published 2009.

Laczik, B., "Design and Manufacturing of Non-Circular Gears by Given Transfer Function" [online], http://www.hjexagon.de/pdf/noncgear.pdf, accessed, Jun. 28, 2012.

Zarebski, I., et al., "Designing of Non-Circular Gears", The Archive of Mechanical Engineering, (month unknown) 2008, LV(3), pp. 275.292.

"Swing-piston engine", Wikipedia, http://en.wikipedia.org/wiki/Swing-piston_engine, accessed Dec. 8, 2011.

"Mixer—Illustrating Planetary Gear and Elliptical Gears", Fischertechnik Exchange Forums [online], http:/fischertechnik.freeforums.org, accessed Feb. 2, 2012.

"Non-circular gears & Non-circular planetary gears Design", [online], http://www.8625plus2.com/prdocuts/NCG-SJ.en.htm, accessed Feb. 6, 2012.

"Column gear ellipsoid gear planetary system transplanting mechanism", ChemYQ [online], http://www.chemyq.com/patentfmen/pt6/50378_07FD3.htm, accessed Feb. 6, 2012.

* cited by examiner

PISTON ENGINE

CROSS-REFERENCE TO RELATED APPLICATIONS

This application claims the benefit under 35 USC 119(e) of U.S. provisional application Ser. No. 61/666,767 filed Jun. 29, 2012.

TECHNICAL FIELD

Oscillating piston systems.

BACKGROUND

Alternatives to the conventional reciprocating engine are well known (for example, the well-established Wankel engine and alternatives such as those in U.S. Pat. No. 6,886,527 or 7,600,490). Commonly, parts rotating or oscillating about a central axis define the working volume of a combustion chamber. Many of these designs suffer from issues related to seal complexity and wear, lubrication issues, methods of converting oscillatory motion or oscillatory rotational motion generated by the combustion chambers to rotational motion in a shaft, and the challenges arising from the huge rotational forces that exist in high-speed rotating systems (see for example U.S. Pat. No. 6,739,307). Well known methods exist for converting rotational motion with oscillation to rotational motion, or vice versa (see for example U.S. Pat. No. 4,844,708), but few satisfactory attempts have been made at converting net-zero-motion rotational oscillations to continuous rotation (see for one such example U.S. Pat. No. 5,222,463).

SUMMARY

In one embodiment, the piston system comprises a first arm and a second arm, each mounted respectively on a first shaft and a second shaft, and being mounted coaxially for rotation about a central axis. Both arms terminate radially outward from the central axis, coupled to piston arrangements. The piston arrangements include pistons on either side of each arm. The sets of pistons are mounted for movement within respective stationary chambers. Each stationary chamber may be defined, at least in part, by a piston of the first arm and a piston of the second arm. The piston of the first arm and the piston of the second arm may be opposed to one another to capture energy from both ends of the combustion chamber. The stationary chambers are arranged about the central axis. The first and the second shaft are connected to an energy transfer mechanism. The energy transfer mechanism includes coupled non-circular gears arranged to convert oscillatory rotational motion to unidirectional rotational motion, for example as controlled by planetary circular gears referenced to a stationary, grounded circular sun gear.

Although conventionally planetary gears often rotate within an external ring gear, the term "planetary gear" as used in this document does not require the existence of an external ring gear. "Oscillatory rotational motion" is used interchangeably with "rotational oscillatory motion" in this disclosure.

In one embodiment, the piston arrangements may be toroidal in shape, travelling in toroidal combustion chambers, and affixed solidly to the arms.

In another embodiment, the pistons may be right-cylindrical in shape, arranged at the two ends of a body of fixed length, and may be coupled to the arms, preferentially by means of a rack and partial pinion arrangement, or by other means by which an oscillating rotational element may be coupled to a linear motion element.

In yet another embodiment, the pistons may be right-cylindrical in shape, with the two pistons in one arrangement each having an independent mechanism coupling it to the arm, allowing the two pistons in the arrangement to move equally but at different angles, preferentially at 90 degrees from each other. This coupling may be achieved through a partial pinion—to idler gear—to rack arrangement, or by some other means by which an oscillating rotational element may be coupled to a linear motion element at an oblique angle. The pistons from one arrangement may be collinear with pistons from the other arrangement, resulting in a fully opposed piston configuration for each stationary chamber.

Each stationary chamber may further be defined in part by an engine block, forming one half of each stationary chamber, and a head, forming the other half of each stationary chamber. The combustion chambers may further be partially enclosed within cylinder sleeves, which may provide seamless chambers within which the pistons may move. Each stationary chamber may further involve an intake port and an outtake port, each respective port being located on a surface of each respective stationary chamber neither defined nor traversed by a piston. In one embodiment, each intake port and outtake port is placed on the engine block. Additionally, the outtake port may lie radially outward, with respect to the central axis, from the intake port of each respective stationary chamber. Further, to ensure evenness of burn and venting, each intake port and exhaust port may be placed equidistant from the piston of the first arm and the piston of the second arm defining at least in part each respective stationary chamber. As is usual in a combustion engine, the intake port may be larger in surface area than the exhaust port.

In another embodiment, each intake port and exhaust port further comprises, respectively, an associated intake valve and an exhaust valve. The valves may be poppet valves. In addition, the opening and closing of the intake and exhaust valves may be controlled by a rotating cam plate. When the piston system is used as an internal combustion engine, each stationary chamber may further include an ignition mechanism, which may be possibly a spark ignition system or compression ignition system as best suits the fuel of choice for a particular implementation.

In a further embodiment, the energy transfer mechanism of the piston system includes an energy transfer shaft, a first central bilobe gear, and a second central bilobe gear. Both the first central bilobe gear and the second central bilobe gear may be mounted for partial rotation about the central axis, on respectively the first shaft and the second shaft. The energy transfer mechanism further includes a gear stack. The gear stack comprises a first planetary bilobe gear meshed with the first central bilobe gear, and a second planetary bilobe gear meshed with the second central bilobe gear. Both the first planetary bilobe gear and the second planetary bilobe gear may be affixed together and rotationally mounted on a planetary gear shaft connected by means of a yoke to the energy transfer shaft, to rotate with the energy transfer shaft as the first and second planetary bilobe gears rotate with planetary revolution about the central axis, controlled by a mechanism that maintains a static reference to the engine block.

In a further embodiment, the piston system further includes a circular sun gear stationary with respect to the stationary chamber. The circular sun gear may be affixed to the engine block, providing a constant reference and anchor point for both motion and energy transfer. The gear stack further includes, as a mechanism to maintain a stabilizing reference to the engine block, a circular planetary gear mounted to revolve around the circular sun gear. The circular planetary gear may be fixed to the first planetary bilobe gear and the second planetary bilobe gear for rotation and planetary revolution with the first planetary bilobe gear and the second planetary bilobe gear. The gear stack may be coupled to the energy transfer shaft in such a way as to link net-zero-motion oscillation of the central non-circular gears through rotational and revolutionary motion of the planetary gear stack to rotational motion of the energy transfer shaft with respect to the stationary circular sun gear. The circular planetary gear may be fixed to the first and second planetary bilobe gears and rotationally mounted on a planetary shaft connected to a yoke coupled to the energy transfer shaft to rotate with the energy transfer shaft.

With the circular planetary gear fixed in revolutionary and rotational motion with the first and second planetary bilobe gears, the first planetary bilobe gear may control the oscillatory motion of the first central bilobe gear, which may, in turn, be connected through the first shaft to the first arm and coupled to a piston arrangement. Similarly, the second planetary bilobe gear, possibly being mounted with its major axis perpendicular to that of the first planetary bilobe gear, may control the oscillatory motion of the second central bilobe gear, which may, in turn, be connected through the second shaft to a second arm coupled to a piston arrangement.

The first central bilobe gear and the second central bilobe gear may further be mounted so that their major axes are perpendicular to each other when the first arm and the second arm are perpendicular to each other.

In a further embodiment, a balancing planetary gear stack may be mounted on a side of the central axis opposite the gear stack. The balancing gear stack may equalize forces experienced by moving parts, and may provide a natural balancing mass for the first planetary gear stack. The balancing gear stack may include a first and a second balancing planetary bilobe gear meshed respectively with the first and second central bilobe gears. Both the first and second balancing planetary bilobe gears may be rotationally mounted on a planetary gear shaft connected to the energy transfer shaft through a yoke to rotate with the energy transfer shaft when the first and second balancing planetary bilobe gears rotate with planetary revolution about the central axis. The balancing gear stack may further include a balancing circular planetary gear mounted to revolve around the circular sun gear, being affixed to the first and second balancing planetary bilobe gears and rotationally mounted on a planetary gear shaft connected to the yoke so as to rotate and revolve with the first and second balancing planetary bilobe gears.

In an additional embodiment, the first bilobe planetary gear, the first central bilobe gear, the second bilobe planetary gear, and the second central bilobe gear are double helical gears. Preferably, when double helical gears are used, all the gears in the energy transfer mechanism are double helical gears. Double helical gears are used to allow for significantly higher rotational velocity and energy transfer as compared to spur gears, while eliminating the need for thrust bearings as would be required for single helical gears.

In a further embodiment, the energy transfer mechanism may function as a self-contained device, without the piston system, to convert unidirectional rotational motion to net-zero-motion oscillation, or vice versa. The resulting oscillation may be that of differential motion between two concentric shafts, or, using only one set of non-circular gears in conjunction with the controlling circular gears, may produce oscillatory motion of a single shaft.

The energy transfer mechanism may comprise a fixed shaft defining a central axis, whether physically at the center or as the outside shaft sleeve of a concentric set of shafts, an energy transfer shaft, a first bilobe gear mount shaft and a second bilobe gear mount shaft mounted for net-zero-motion rotational oscillation about the central axis. Additionally, the energy transfer mechanism may comprise a first central bilobe gear mounted for net-zero-motion rotational oscillation about the central axis on the first bilobe gear mount shaft, a second central bilobe gear mounted for net-zero-motion rotational oscillation about the central axis on the second bilobe gear mount shaft, a circular sun gear that is stationary with respect to the fixed shaft, a gear stack comprising a first planetary bilobe gear meshed with the first central bilobe gear, and a second planetary bilobe gear meshed with the second central bilobe gear. Further, the energy transfer mechanism may include a circular planetary gear mounted to revolve around the stationary circular sun gear, the circular planetary gear being fixed to the first planetary bilobe gear and the second planetary bilobe gear for planetary revolution with the first planetary bilobe gear and the second planetary bilobe gear. The first planetary bilobe gear and the second planetary bilobe gear may be affixed together and rotationally mounted on a planetary gear shaft connected to the energy transfer shaft to rotate with the energy transfer shaft when the first planetary bilobe gear and the second planetary bilobe gear rotate with planetary revolution about the central axis.

In a further embodiment an energy transfer mechanism may comprise a fixed shaft defining a central axis, an energy transfer shaft mounted for rotation about the central axis and a bilobe gear mount shaft mounted for rotational oscillation about the central axis, a central bilobe gear mounted for rotational oscillation about the central axis on the bilobe gear mount shaft, a circular sun gear that is fixed with respect to the fixed shaft, and a gear stack comprising a planetary bilobe gear meshed with the central bilobe gear, a circular planetary gear mounted to rotate as it revolves around the circular sun gear, the circular planetary gear being connected to the planetary bilobe gear to rotate and revolve with the planetary bilobe gear as it revolves about the central axis, the planetary bilobe gear being connected to the energy transfer shaft to rotate with the energy transfer shaft when the planetary bilobe gear rotates as it revolves about the central axis. There may also be a balancing gear stack mounted on a side of the central axis opposite to the gear stack. The balancing gear stack may comprise a balancing planetary bilobe gear meshed to the central bilobe gear, the balancing planetary bilobe gear being connected to the energy transfer shaft to rotate with the energy transfer shaft when the balancing planetary bilobe gear rotates as it revolves about the central axis, and a circular balancing planetary gear mounted to revolve around the circular sun gear, the circular balancing planetary gear being connected to the balancing planetary bilobe gear to rotate as it revolves with the balancing planetary bilobe gear to rotate and revolve with the balancing planetary bilobe gear as it revolves about the central axis, the circular balancing planetary gear being connected to the first balancing planetary bilobe gear on the yoke.

In a further embodiment a piston system may comprise a piston arrangement coupled to a first end of an arm for circumferential movement about the central axis of the arm, the piston arrangement being mounted for circumferential movement within a fixed chamber that extends circumferentially about the central axis, the arm being secured to a shaft that is mounted for rotation about the axis, the shaft being connected to an energy transfer mechanism, the energy transfer mechanism including coupled non-circular gears arranged to convert oscillatory rotational motion to unidirectional rotational motion. In a further embodiment the piston arrangement may comprise a pair of pistons facing in opposite directions. The arm may have a second end extending beyond the central axis in an opposite direction to the first end, the second end coupled to a second piston arrangement comprising a pair of pistons facing in opposite directions.

In a further embodiment a piston system comprises an arm arranged to rotate about an axis, a piston arrangement coupled to a first end of the arm by a partial gear pinion section, the piston arrangement including a piston mounted for movement within a right-cylindrical stationary chamber, the arm being connected to an energy transfer mechanism, and the energy transfer mechanism including coupled non-circular gears arranged to convert oscillatory rotational motion to unidirectional rotational motion. The piston arrangement may comprise a pair of pistons facing in opposite directions. The arm may have a second end extending beyond the axis in an opposite direction to the first end, the second end coupled to a second piston arrangement comprising a pair of pistons facing in opposite directions.

In a further embodiment a piston system comprises an arm arranged to rotate about an axis, an end of the arm terminating in a partial gear pinion section coupled to an idler gear further coupled to a piston arranged to move within a right-cylindrical stationary chamber, each of the first shaft and the second shaft being connected to an energy transfer mechanism, and the energy transfer mechanism including coupled non-circular gears arranged to convert oscillatory rotational motion to unidirectional rotational motion. The idler gear may be further connected to a further piston in a further right cylindrical chamber. The arm may have a second end extending beyond the axis in an opposite direction to the first end, the second end terminating in a partial pinion section coupled to an idler gear connected to a pair of pistons arranged to move in respective right cylindrical chambers.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
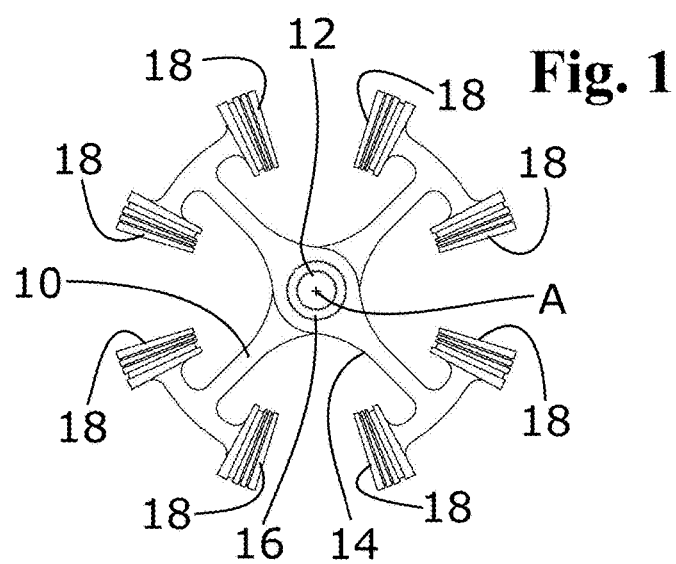
FIG. 1 is a simplified diagram of eight toroidal piston faces arranged on two piston assemblies.
Figure 2:
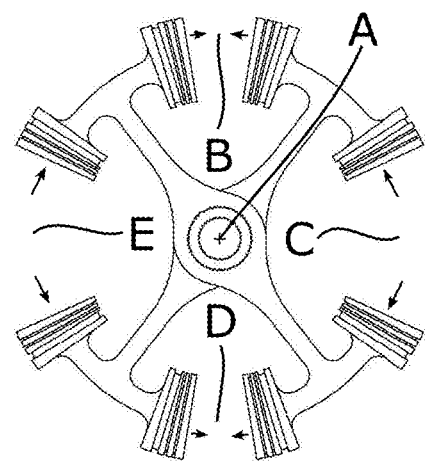
FIG. 2 shows the arrangement of the piston faces when the top and bottom chambers are undergoing compression.
Figure 3:
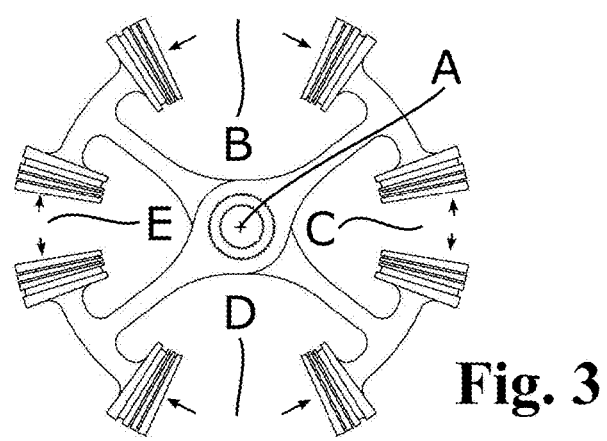
FIG. 3 shows the arrangement of the piston faces when the top and bottom chambers are undergoing expansion.

As seen in FIG. 1, the four combustion cycles act between eight piston faces on two piston assemblies. The first piston assembly consists, in part, of a first arm 10 mounted on a first shaft 12, and rotates about a central axis A. Similarly, the second piston assembly consists, in part, of a second arm 14 mounted on a second shaft 16 coaxial to the first shaft 12. Both the first and second arms terminate radially outward from the central axis A in piston arrangements. Each piston arrangement includes two pistons 18. A piston arrangement may have four piston faces in two pairs of pistons. The piston assemblies do not rotate, but rather oscillate back and forth, as shown in FIGS. 2 and 3. Each piston 18 oscillates circumferentially within a corresponding stationary chamber

Figure 4:
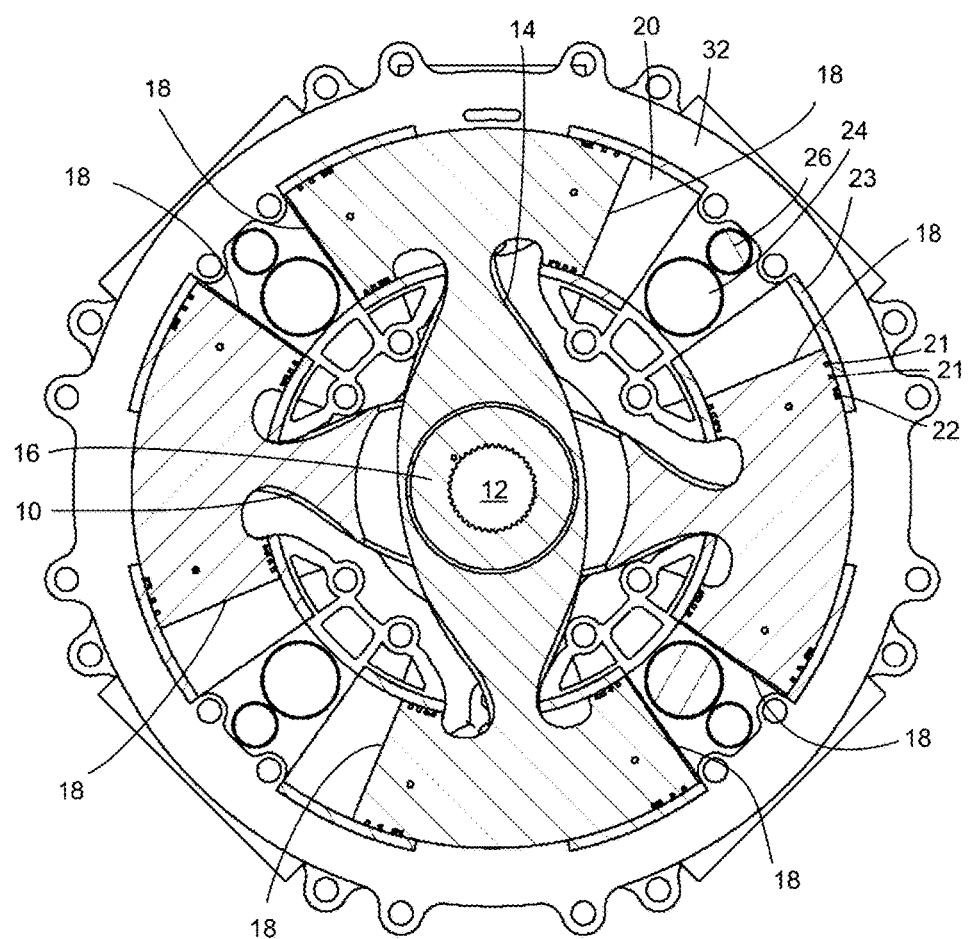
FIG. 4 is a perspective section of toroidal pistons shown within their combustion chambers, fixed to the oscillator arms.

20 (FIG. 4). Each stationary chamber 20 is defined in part by a piston 18 of the first arm 10 and a piston 18 of the second arm 14. Each stationary chamber extends circumferentially about the central axis A.

During one quarter of a complete rotation (FIG. 2) of the energy transfer mechanism 60 (see below for a detailed description), compression occurs between two sets of pistons B and D; and expansion between two other sets of pistons C and E. In the second quarter of a complete rotation (FIG. 3) of the energy transfer mechanism, expansion occurs between two sets of pistons B and D; and compression occurs between the other two sets of pistons C and E. The process repeats for the third and fourth quarters of a complete rotation of the energy transfer mechanism 60 producing four strokes for each chamber per rotation of the energy transfer mechanism 60, making it the equivalent of a V-8 conventional engine. Since all forces in the combustion chamber act equally but in opposite directions on the two piston assemblies, little energy is distributed to the body of the engine, resulting in increased efficiency and reduced vibration. Also, since the expansion of the chamber results from the differential movement of two piston faces, the actual motion of each piston is only half of the total stroke. This helps to ensure that rotational forces on key motor components are kept to a minimum. Wear is minimized, and seals have little tendency to pull away from their sealing surfaces.

Figure 5:
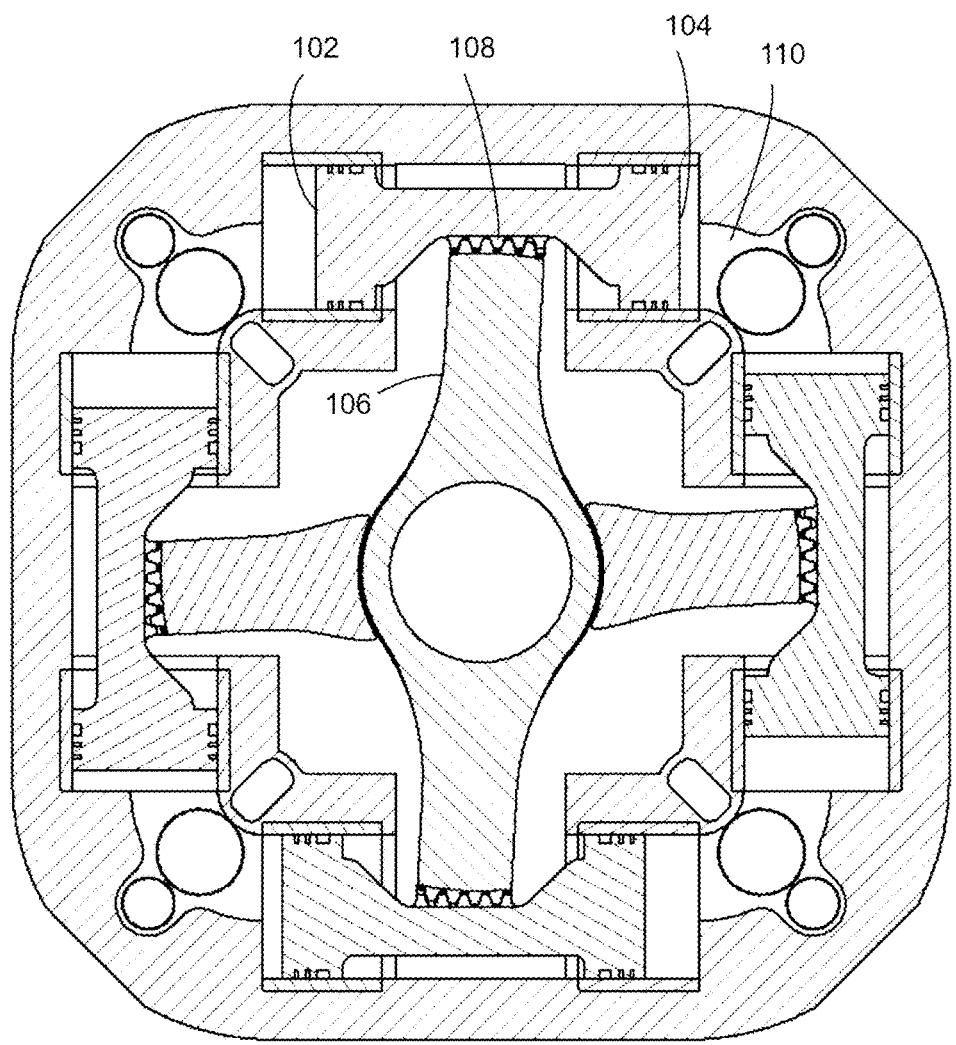
FIG. 5 is a perspective section of pistons of right-cylindrical shape coupled to the oscillator arms by means of a partial pinion and rack arrangement.

The pistons may also, for ease of manufacture and further reduction of rotational forces, be right-cylindrical in shape, travelling in combustion chambers that are right-cylindrical. However, to achieve this, the pistons must be separated from the control arms and linked in a way that converts rotational motion to linear motion. FIG. 5 shows one such arrangement, in which the two pistons 102 and 104 at one end of an arm 106 are positioned at each end of a gear rack 108, coupled to the end of the arm which acts a partial pinion in a rack and pinion arrangement. This configuration of the pistons has the advantages of simplicity, ease of manufacture, and durability; however, the combustion chamber 110 now comprises two sections at right angles to each other, creating an outward moment acting on the engine block and head during expansion, thereby losing some of the energy to vibration.

Figure 6:
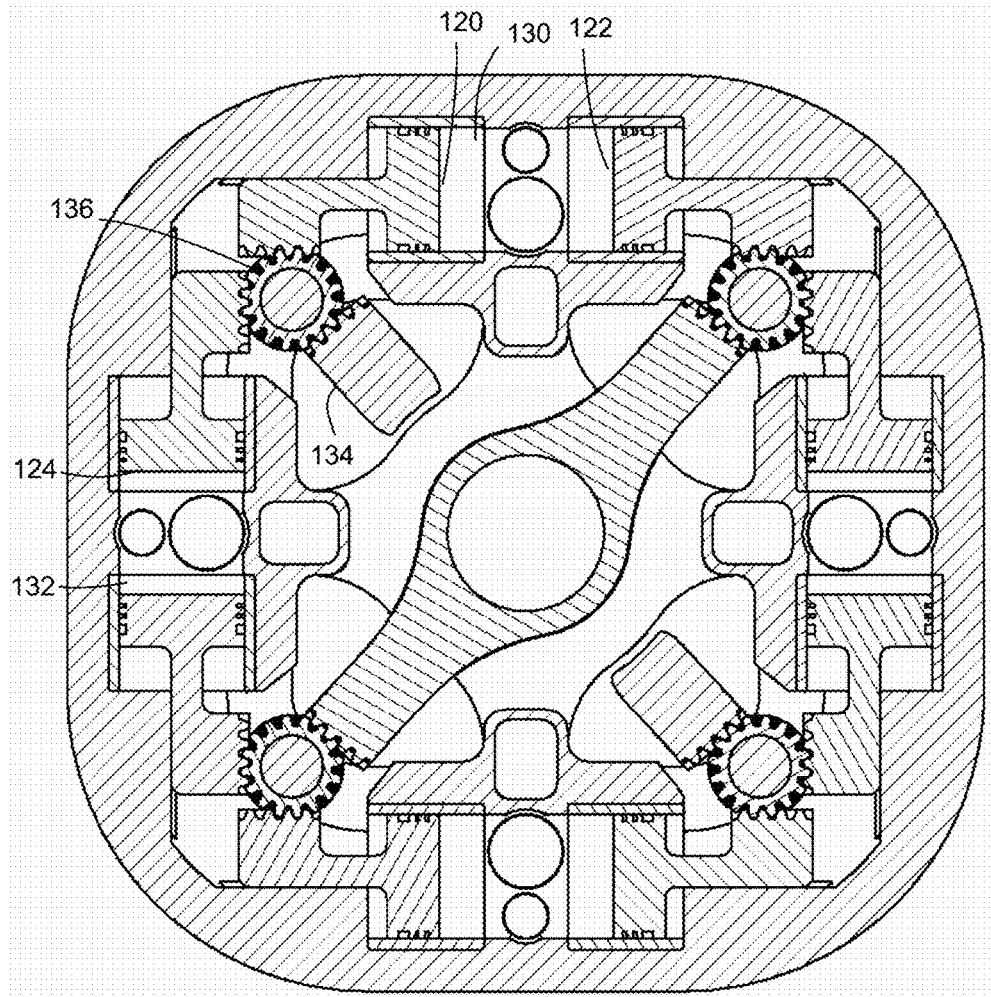
FIG. 6 is a perspective section of independent pistons of right-cylindrical shape arranged so that pistons of one arm are collinear with pistons of the other arm, coupled to the arms by means of a partial pinion—to idler gear—to rack arrangement.

FIG. 6 shows an arrangement in which the pistons are, again, right-cylindrical. However, in this arrangement, the two pistons 120 and 122 in a given combustion chamber 130 are fully opposed to each other, so no energy is lost to the engine block and head. In order to achieve the necessary motion, the end of an arm 134 is coupled to an idler 136 which, in turn, is coupled to two pistons 120 and 124, one in each of two combustion chambers 130 and 132. This configuration has the advantages of full-opposition of the pistons and ease of manufacture; however, the design is significantly more complex with a greater parts count.

Figure 7:
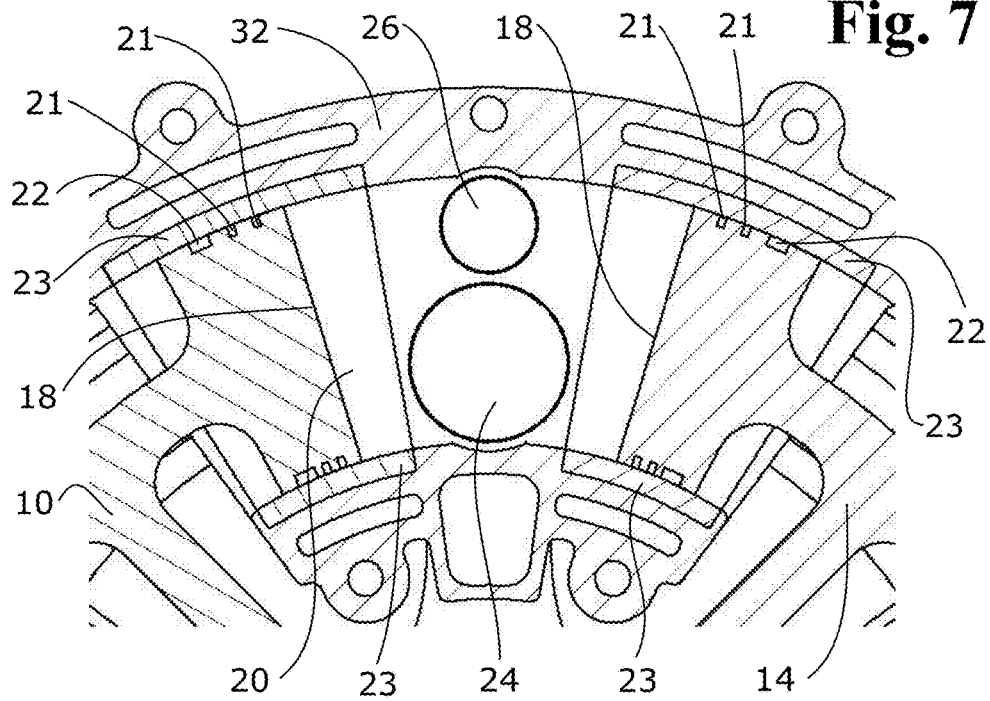
FIG. 7 is a perspective of a stationary chamber in a toroidal configuration, viewed from above.
Figure 8:
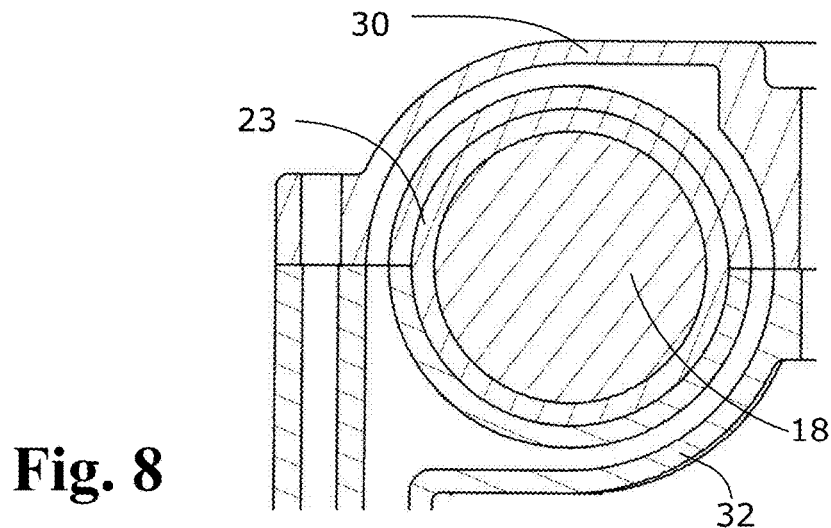
FIG. 8 shows a vertical cross-section view of a toroidal stationary chamber through one of the pistons.

All three of the configurations share basic operational characteristics and design elements; consequently, the remaining discussion returns to the first configuration, and can be applied to the other configurations as well. The combustion chambers, being stationary, are constructed around the pistons 18 by fastening a head 30 and a matching engine block 32 together. This forms a fully-enclosed space within which the pistons oscillate, as seen from above in FIG. 7, and in vertical cross-section in FIG. 8. This makes possible the use of conventional ring compression seals 21 and lubricant-distribution rings 22, such as those used in the conventional reciprocating engine—a well-developed and reliable technology. The combustion chamber may be enclosed by cylinder sleeves 23, which may provide a seamless chamber within which the pistons may move.

Figure 9:
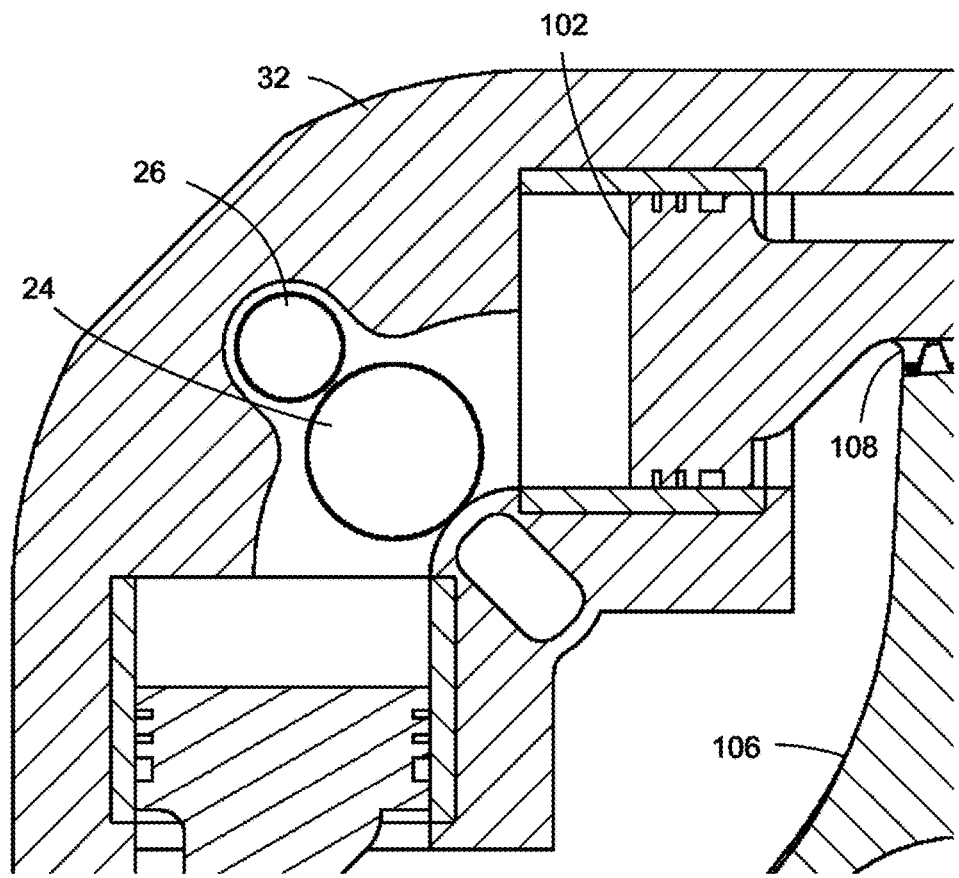
FIG. 9 is a perspective of a stationary chamber arranged between pistons of right-cylindrical shape in an arrangement where the pistons are typically coupled to the oscillator arms by means of a rack and partial pinion arrangement.
Figure 10:
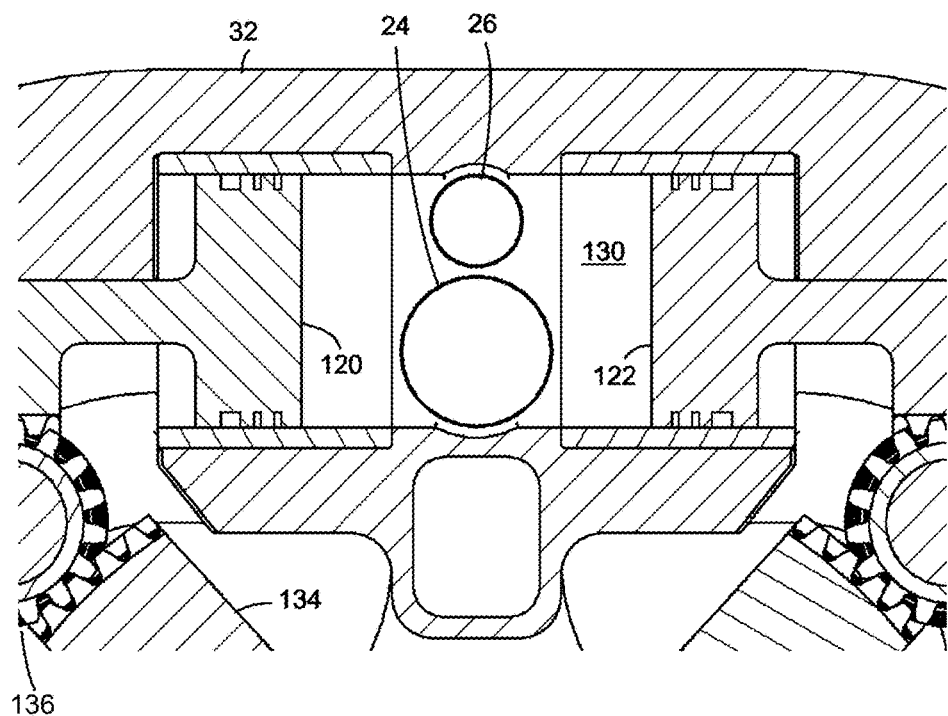
FIG. 10 is a perspective of a stationary chamber arranged between fully-opposed pistons in an arrangement where the pistons are coupled to the oscillator arms by means of a partial pinion to idler gear to rack arrangement.
Figure 11:
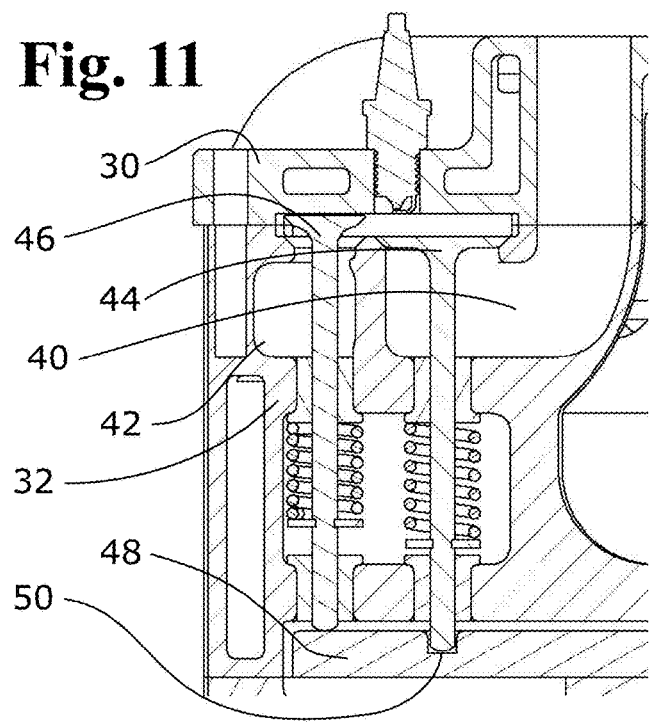
FIG. 11 is a cut-away view of the intake and exhaust ports and their corresponding poppet valves.
Figure 12:
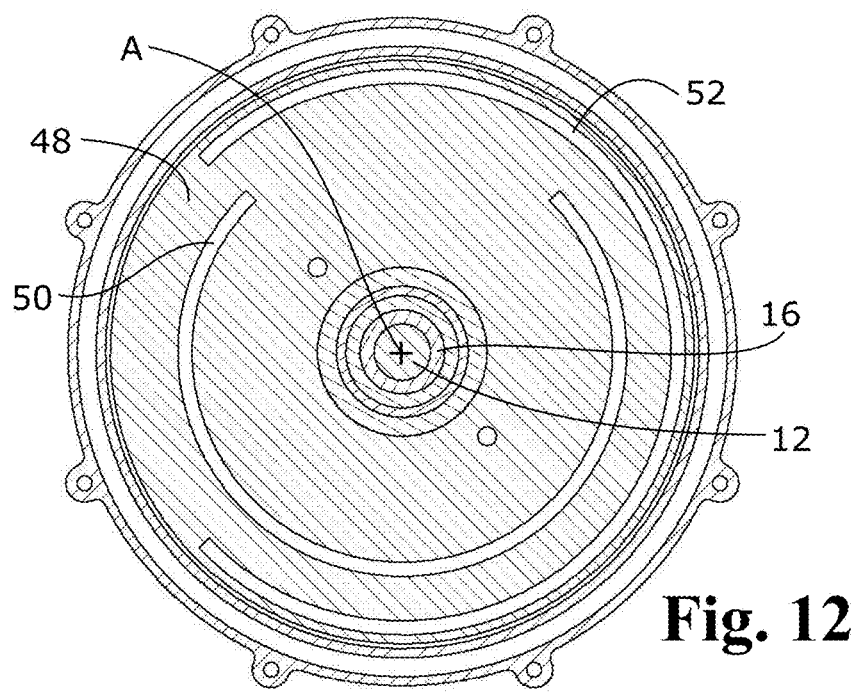
FIG. 12 is a vertical view of the valve cam plate associated with the intake and exhaust poppet valves.

Each chamber has an intake port 24 and an exhaust port 26. The intake port 24 and exhaust port 26 are located on a surface of the chamber not defined by a piston 18. In particular, the intake port 24 and exhaust port 26 may be located on the engine block 32. The ports may be placed at the centre of the chamber, equidistant from the pistons 18, enhancing the evenness of burn and venting. Each intake port 24 lies inward from each respective exhaust port 26. FIG. 9 shows the arrangement of the chamber, the intake port, and exhaust port for the configuration of FIG. 5, and FIG. 10 shows the same for the configuration of FIG. 6. As shown in FIG. 11, an intake manifold 40 is on the inside, and exhaust is vented through the side of the combustion chamber in an exhaust manifold 42. Each intake port 24 has an associated intake valve 44; each exhaust port 26 has an associated exhaust valve 46. Rather than using intake and exhaust ports opened and closed by moving pistons, as is typical for most rotary engines, conventional poppet valves, 44 and 46, are employed, again using well-developed and reliable technology, as shown in FIGS. 11 and 12. The valves reside in what would traditionally be considered the engine block 32, so that they can be controlled by a rotating cam plate 48. This plate 48 rotates once per cycle, so, unlike the conventional reciprocating engine, no additional gearing is required for valve control. The plate further comprises an intake valve cam track 50 and an exhaust valve cam track 52 which control the opening and closing of intake valves 44 and exhaust valves 46 as the cam plate rotates.

Each stationary chamber further comprises a respective ignition mechanism. Since each combustion chamber fires once per revolution, ignition timing involves sequential spark generation at each quadrant of the rotation of the output shaft for the combustion chamber at each of those quadrants. This spark generation could involve a simple magneto and points, a coil/point/condenser ignition system, or an electronic ignition system. A diesel adaptation of this engine could employ standard compression ignition techniques.

The opposing pistons 18 undergo two expansion-compression oscillations each per rotation of the energy transfer mechanism 60, exhibiting, in each of the four combustion chambers 20, the four necessary strokes: intake, compression, combustion, and exhaust.

Swing-piston engines often fall prey to the same disadvantages. Most rotational systems involve parts rotating with high angular velocity around a central shaft. The centripetal forces involved in holding these systems together are significant. Any seals, valves, or other components on the rotating parts are exposed to uneven and often extreme wear. The use of pressurized lubrication is limited because most of these systems rely on moving pistons, vanes, or rotors acting across intake and output ports. Thus, unlike in traditional reciprocating piston systems, complicated seals are necessary. This creates significant points of failure from the types of pitting and corrosion occurring between the moving components and the ports in the stators. Many rotational systems involve numerous high-pressure seals between rotating parts and stators, often complicated by discontinuities between radial and axial flat or curvilinear surfaces. In addition, motion control in rotational systems is often complex and bulky, negating the advantages of the compact rotary system.

Further, in the oscillatory swing-piston engine, a system is required to convert the oscillations to rotary motion. Typically, these systems involve cranks, pins, cams, and connecting rods, which usually convert rotational motion to linear motion and back to rotational motion. Although inexpensive, these systems are relatively complex, and leave room for mechanical failure and loss of accuracy in motion.

The present piston system relies on the net-zero-motion oscillation of pistons. Here, since the piston assemblies each move only half of the required distance for full displacement, oscillatory motion is minimal. This avoids the issue of extreme angular momentum mentioned above. Further, the chambers within which the pistons move are stationary, and completely surround the circular face of the pistons, unlike the majority of swing piston designs, and particularly unlike the design of U.S. Pat. No. 5,222,463, in which the entire block and head of the motor rotate around the piston arrangement. Thus, in the present design, common pressure seals and pressurized lubrication may be employed, as in the conventional reciprocating piston system.

Figure 13:
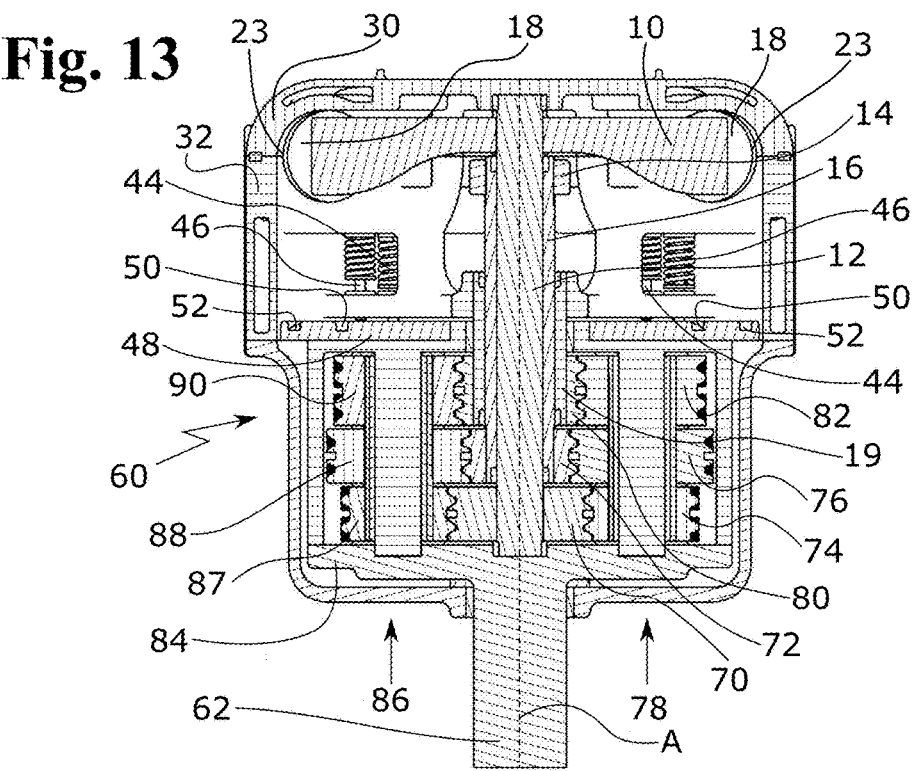
FIG. 13 is a vertical cross section of the energy transfer mechanism and the piston assembly.
Figure 14:
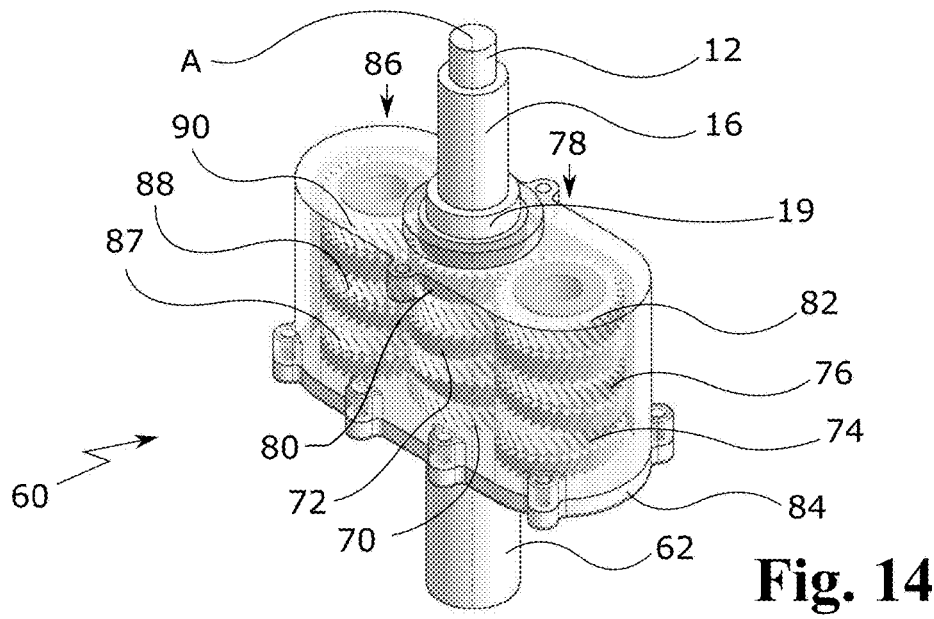
FIG. 14 is a transparent view of an energy transfer mechanism with two gear stacks using double helical gears.

An energy transfer mechanism 60 converts oscillatory rotational motion to unidirectional rotational motion (as seen in FIGS. 13 and 14). The energy transfer mechanism is connected to the first piston arm 10 and the second piston arm 14 through, respectively, the first shaft 12 and the second shaft 16. The energy transfer mechanism includes coupled non-circular gears. These are arranged to convert the oscillatory rotational motion of the piston arms and their corresponding shafts to unidirectional rotational motion in an energy transfer shaft 62.

The energy transfer mechanism 60 is constructed as follows. The basic design is illustrated in FIGS. 13 and 14. For the sake of clarity, the discussion will be based on the use of elliptical bilobe gears (ie bilobe gears derived from unilobe ellipses) as the preferred non-circular gear configuration. Other configurations, such as elliptical unilobe, trilobe, square, or custom-designed gears could also be used, resulting in compression-expansion patterns other than the four strokes required for the present internal combustion engine. However, each configuration would require specific engineering to ensure constant shaft center distance and pressure angle.

Figure 15:
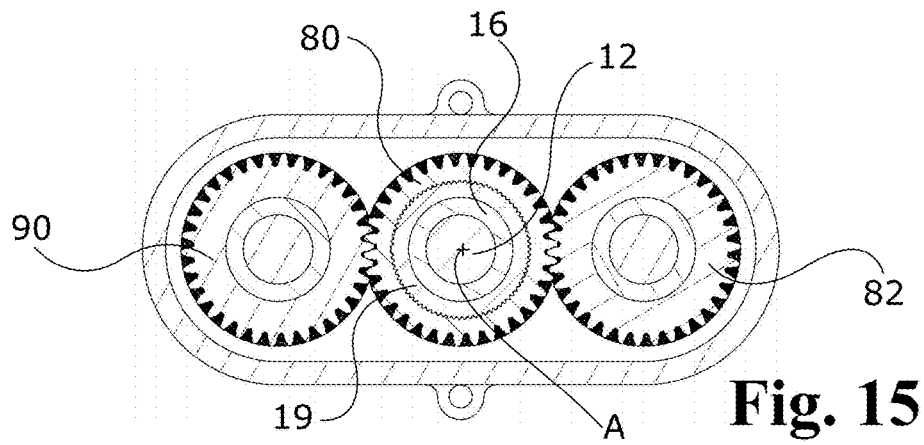
FIG. 15 is a cross section view of an energy transfer mechanism through the lower set of non-circular gears.
Figure 16:
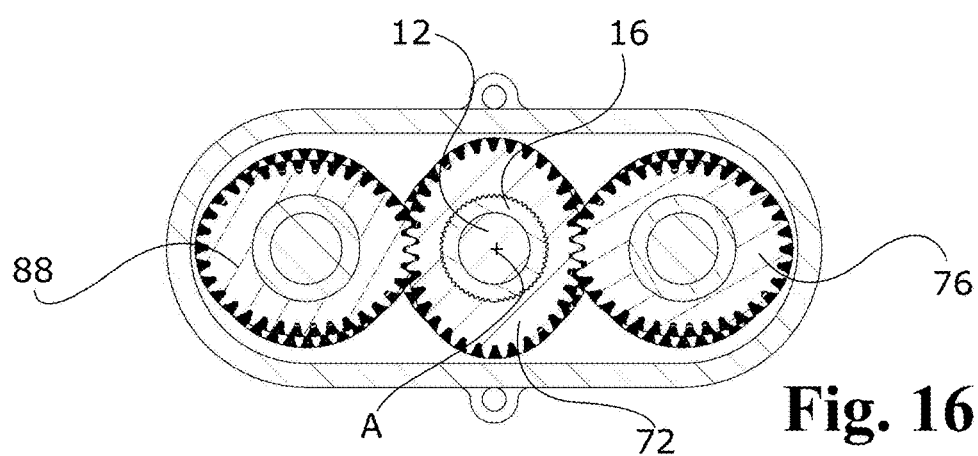
FIG. 16 is a cross section view of an energy transfer mechanism through an upper set of non-circular gears.
Figure 17:
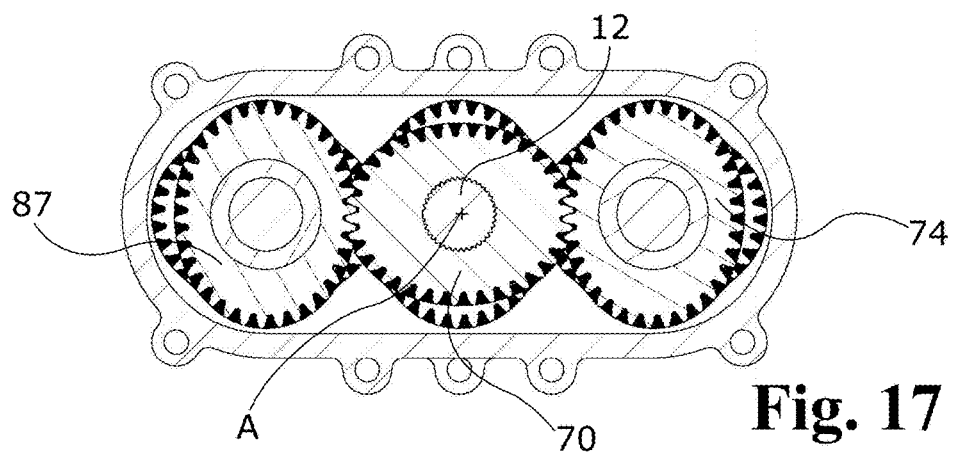
FIG. 17 is a cross section view of an energy transfer mechanism through the circular gears.

A first central bilobe gear 70 (FIG. 15) is mounted for oscillatory rotational motion about the central axis A on the first shaft 12. Similarly, a second central bilobe gear 72 (FIG. 16) is mounted for oscillatory rotational motion about the central axis A on the second shaft 16. A first planetary bilobe gear 74 (FIG. 15) is meshed with the first central bilobe gear 70; a second planetary bilobe gear 76 (FIG. 16) is meshed with the second central bilobe gear 72. The first and second planetary bilobe gears are arranged into a planetary gear stack 78. The planetary gear stack 78 is rotationally mounted on a planetary gear shaft connected to the energy transfer shaft 62 to rotate with planetary revolution about the central axis A, and revolves with the energy transfer shaft 62. The first set of bilobe gears corresponds to the oscillation of the first piston assembly; the second set of bilobe gears corresponds to the second piston assembly. The first central bilobe gear 70 and the second central bilobe gear 72 are mounted so that they are 90 degrees to each other when the first arm and the second arm are perpendicular to each other.

Figure 19:
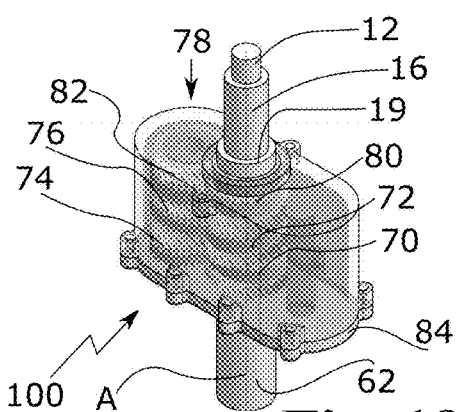
FIG. 19 is a transparent view of an energy transfer mechanism with a single planetary gear stack employing double helical gears for high-speed low-power applications.

A circular sun gear 80 (FIG. 17) is included, the sun gear being stationary with respect to the stationary chambers 20. It is possible to provide a fixed reference to the circular sun gear either by means of an outside concentric fixed shaft 19, as shown in FIGS. 13,14 and 19, or by a central fixed shaft, as shown in FIGS. 15-17 and 20-23. The choice of reference affects the order in which the layers of gears appear. The central, stationary, circular sun gear 80 maintains alignment of all the moving parts. The gear stack 78 further comprises a circular planetary gear 82, meshed with the circular sun gear 80. The circular planetary gear 82 revolves around the circular sun gear 80, being fixed to the first planetary bilobe gear 74 and the second planetary bilobe gear 76 for planetary revolution with the first planetary bilobe gear 74 and the second planetary bilobe gear 76. The circular planetary gear 82 is fixed to the first planetary bilobe gear 74 and the second planetary bilobe gear 76 and rotationally mounted on a planetary gear shaft connected to a yoke 84. The yoke 84 rotates with the energy transfer shaft 62. The axis of the yoke 84 is coaxial to the central axis A. Since the planetary non-circular gears are affixed to the circular planetary gears, they make a single rotation in half a revolution of the yoke.

In a preferred embodiment, the balancing gear stack 86 is diametrically opposed to the first gear stack 78. The balancing gear stack may handle an equal amount of power to the first gear stack, and may equalize forces within the energy transfer mechanism. The balancing gear stack 86 is similar in construction to the first gear stack 78. A first balancing planetary bilobe gear 87 (FIG. 15) is meshed to the first central bilobe gear 70; a second balancing planetary bilobe gear 88 (FIG. 16) is meshed to the second central bilobe gear 72. A circular balancing planetary gear 90 (FIG. 17) is mounted to revolve around the circular sun gear 80. The balancing gears are affixed together and rotationally mounted on a planetary gear shaft connected to the energy transfer shaft to rotate with the energy transfer shaft when the balancing planetary gears rotate with planetary motion about the central axis A. The circular balancing planetary gear 90 is fixed to the first balancing planetary bilobe gear 86 and the second balancing planetary bilobe gear 88 and together they are rotationally mounted on a planetary gear shaft through the yoke 84. The balancing gear stack moves with planetary revolution about the central axis A.

As the gear stack 78 revolves around the stationary sun gear 80, the central bilobe gears must oscillate back and forth due to the variation of the instantaneous radii of driven and driving gears, as in the explanation that follows. The two oscillate in opposite rotational direction to each other, since the non-circular planetary gears are at 90 degrees to each other.

When the instantaneous radius of a planetary gear is greater than that of a corresponding central gear, the central gear moves in opposite rotational direction from the energy transfer shaft 62 and the yoke 84. When the instantaneous radius of a planetary gear is less than that of a corresponding central gear, the central gear moves in the same rotational direction as the transfer shaft 62 and the yoke 84. However, since the total perimeter of the central and planetary gears is identical, the net rotational motion of the central gear for a half revolution of the planetary assembly is zero. If the non-circular gears are bilobe gears, the central bilobe gear, and the oscillator shaft attached thereto, complete two complete oscillations per rotation of the case and energy transfer shaft 62, motion suited to a four-stroke internal combustion engine. The above explanation in this paragraph assumes that the planetary gears have the same total perimeter as the central gears and that the lobed planetary gears have the same number of lobes as the lobed central gears. Alternatively, the planetary gears may have a different perimeter from the central gears and a corresponding different number of lobes. In this case, when the ratio of the instantaneous radius of a planetary gear to the instantaneous radius of a corresponding non-circular central gear is greater than the ratio of the radius of the circular planetary gear to the radius of the circular sun gear, the non-circular central gear moves in an opposite rotational direction from the energy transfer shaft 62 and the yoke 84. When the former ratio is smaller than the latter ratio, the non-circular central gear moves in the same rotational direction as the transfer shaft 62 and the yoke 84.

Figure 18:
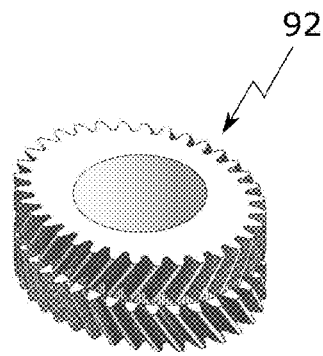
FIG. 18 is a perspective view of a double helical elliptical bilobe gear.

For high-speed operation, helical gears are preferred, best configured as double helical gears 92 to eliminate thrust, as in FIG. 18. A helical gear can operate at approximately five times the speed of a spur-cut involute gear. Single-helix gears experience a great deal of end thrust due to the angle of contact of the teeth. Typically, this is addressed by placing thrust bearings on the sides to which the gears are forced by the helices. However, in an oscillator, this force will be at one instant towards one side, and in the next instant towards the other side. Rather than designing for thrust bearings on both sides of all gears, double helical gears may be utilized, as these exhibit no end thrust other than for basic positioning, and are self-aligning, as seen in FIG. 18. Manufacturing double helical teeth on non-circular gears, at first glance, appears to be a very complex and daunting challenge. Although the mathematical relationships are quite complex, they are based on a relatively simple mechanical concept— that of using a single straight-edged "rack tooth" cutter with the appropriate pressure angle to cut each tooth, as the gear, held at the angle of the helix, rotates with the gear axis moving laterally to match the instantaneous radius. Each tooth automatically changes shape from top to bottom, and each tooth is unique as a result of this cutting process, as required for proper operation. In a typical manufacturing process, this same cut can be achieved by using a gear shaper in which a circular plunge cutter is made to rotate by the angle necessary to produce the desired helix during each plunge, and, as the cutter and gear blank advance for the next plunge, the centre distance and rotation angle of the gear blank are adjusted to produce the required pressure angle and instantaneous radius.

Properly designed gears are engineered for strength and longevity, based upon the power transferred, the meshing velocity of the teeth, the pressure angle, the service factor (in turn based on the level of shock experienced by the teeth), a strength factor based on the type of material and number of teeth, and whether the teeth are subjected to repetitively reversing loading forces. With all of these factors taken into account, it becomes a matter of maximizing the strength of the gears while minimizing the size and complexity of the design. With double helical teeth, there are various additional design characteristics to be considered. Circular pitch, helix angle, and gear face depth affect the number of teeth that mesh at any given time, which in turn affects the required strength of the teeth. Since the gears in the current design rotate on a one-to-one basis, the same teeth mesh together for each revolution, and the loading at each meshing point is always in the same direction—some points are always driven, others are always driving. This means that the calculation for gear longevity results in a much longer life expectancy than for a gear on which the teeth experience reversible loading.

All of this analysis and the associated calculations indicate that bilobe gears with characteristics suitable for high power and high speed may be engineered to perform with precision, high reliability, and long life expectancy.

There are a number of possible design variations. Different non-circular gear configurations could be employed. The elliptical bilobe gears produce a variation in motion that very closely approximates the sinusoidal expansion and compression of the conventional internal combustion engine; however, the shape of the control gears could be changed to maximize efficiency by more closely matching the curves of the Carnot Cycle or by determining a yet more efficient relationship between compression and the expansion resulting from the combustion of gases. Since the valve cam plate system is simple, it could be adapted to allow for infinitely variable valve control, both in terms of timing and throw. For small engine applications, the poppet valves could be replaced with a rotary valve system, in which gaps in rotating cylindrical sections mounted on what was shown previously as the cam plate would provide access to the intake and exhaust ports.

There are several possible other applications. As with any piston system, this piston system could also be used as a fluid pump. As such, more than one set of pistons could be controlled by the same planetary gearing arrangement. For example, in an internal combustion engine, other concentric sets of pistons could be placed on the existing piston assemblies to pump lubricant or fuel. Depending on the nature of the fluid being pumped, the valves could be replaced with ports controlled by the moving pistons. Alternatively, additional cam tracks could be added to the cam plate to drive piston pumps for lubricant or fuel. This system adapts well to operation using external pressure sources, such as compressed air or steam. These applications are two-stroke, an arrangement which may be accommodated by putting a second set of cams on the valve cam plate. The two-stroke arrangement could also be used for a two-stroke internal combustion engine. Using trilobe non-circular gears, a six-stroke system could be employed, such as an internal combustion/steam hybrid. An electrical generator or alternator could be built into the energy transfer mechanism to make the engine into an internal combustion/electric hybrid. By changing the phase relationship of the bilobe gears and introducing a fixed divider at the centre of each chamber, the Sterling Cycle could also be accommodated.

The non-circular planetary gear arrangement, in itself, could be used as a mechanical oscillator for a number of non-engine-related applications. Devices that could employ a dependable rotational mechanical oscillator could include industrial shears and presses, clothes washing machines, mixers, and kitchen tools. In the development of this design, software to produce involute curves on non-circular gears was developed, including the stacking of multiple layers of profiles suitable for characterizing the faces of double helical non-circular gears. This software and the mathematical relationships developed to make it possible could be used in the production of such gears for applications other than the current design.

The energy transfer mechanism can be modified for various other applications. For example, the basic oscillator design can be modified for low power applications, low speed applications, and lower cost. In addition, one set of gears can be left out if a single oscillator is desired. FIG. 19 shows a high-speed lower power application 100, with one gear stack left out. This would require counterbalancing, which is not shown in the figure.

Figure 20:
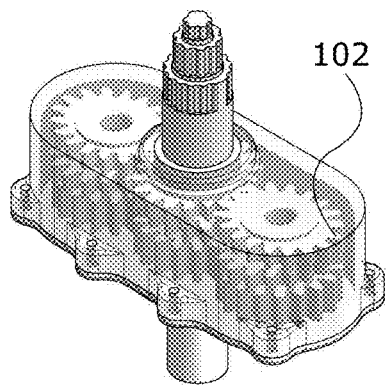
FIG. 20 is a transparent view of an energy transfer mechanism with two gear stacks employing spur-cut gears for low-speed high-power applications.

For low speed and relatively high power, the double helical gears can be replaced with spur-cut gears 102, as shown in FIG. 20. FIG. 20 also shows a different configuration in which the circular sun gear is held stationary by a central shaft rather than an external sleeve, placing it at the bottom of the gear stack instead of the top.

Figure 21:
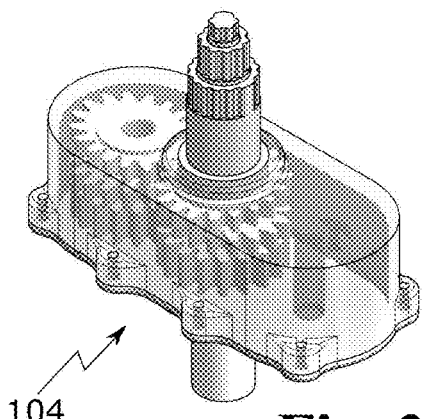
FIG. 21 is a transparent view of an energy transfer mechanism with spur-cut gears, with a single planetary gear stack, for low-speed low-power applications.

For low-speed, low-power applications 104, one of the gear stacks can again be removed, as shown in FIG. 21. This would require counterbalancing, which is not shown in the figure.

Figure 22:
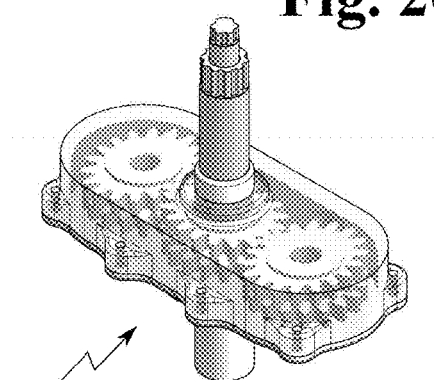
FIG. 22 is a transparent view of an energy transfer mechanism with spur-cut gears, with only a single set of non-circular gears, for a low-speed high-power single oscillator application.
Figure 23:
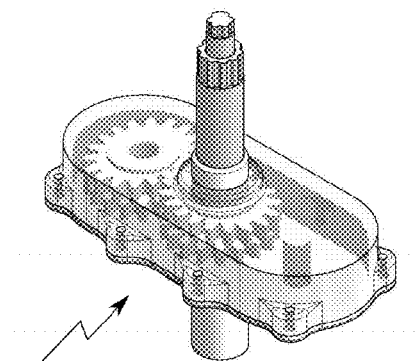
FIG. 23 is a transparent view of an energy transfer mechanism with a single planetary gear stack with spur cut gears, with only a single set of non-circular gears, for a low-speed low-power single oscillator application.

If only a single oscillating element is required 106, one of the layers of non-circular gears can be removed, with the corresponding shaft, as shown in FIG. 22. One of the gear stacks could be removed if the single oscillator is not required to handle high power 108, as in FIG. 23. Again, counterbalancing would be needed.

Another configuration would involve three layers of non-circular gears, with their long axes offset by 60° instead of 90° to produce 3-phase oscillation on three concentric oscillating shafts.

In addition, custom oscillatory motion can be produced by designing non-circular gears that produce other patterns of motion. Different non-circular gear configurations are possible: for example, the base design involves bilobe gears for two complete oscillations (four strokes) per revolution; unilobe gears would provide one oscillation (two strokes) per revolution; trilobe gears would provide three oscillations (six strokes) per revolution; square gears would provide four oscillations (eight strokes) per revolution; custom gear profiles could provide specialized oscillator motion. The primary limitations on design would be maintaining a constant centre distance and ensuring that the teeth do not disengage at any point in the rotation. In addition, discontinuous motion should be avoided where possible to prevent excessive forces on the gears and subsequent wear.

Non-circular gears are gears having a pitch shape that is not circular. In order for two Non-Circular gears to mate properly, their pitch shapes must roll on each other without slip. This means that the sum of their instantaneous pitch radii must equal the centre distance at all times, and that the arcs between matching points on the pitch shapes must also be equal. Non-circular gears that may be used include any non-circular bilobe gear set in which the sums of the instantaneous radii equal the center distance with pitch shapes which roll on each other without slipping. Elliptical bilobes produce a very-nearly sinusoidal result; another combination may produce a "first and third harmonic" shape, etc.

A unilobe gear has one section in which the instantaneous radii at given points are greater than the average radius and one section in which the instantaneous radii at given points are less than the average radius. Unilobe gears generate a single complete cycle of speed change per rotation.

An elliptical gear is defined by a set of points in a plane, such that the sum of the distances from two fixed points— the foci—to any point in the set is a constant. This enables elliptical gears cut about their foci to run at a constant center distance. Elliptical gears are often used where unilobe gears are required.

A bilobe gear is a gear that has two sections in which the instantaneous radii at given points are greater than the average radius and two sections in which the instantaneous radii at given points are less than the average radius. Bilobe gears generate two complete cycles of speed variation per rotation.

Elliptical bilobe gears are gears generated by plotting, in polar form, each instantaneous radius from one focus of the generating ellipse but at half of the angle for that instantaneous radius observed in the generating ellipse. Since the 360° of the generating ellipse have been compressed into 180°, the instantaneous radius at 0° is equal to the instantaneous radius at 180°, placing the generating focus at the center of the bilobe gear. The lower side of the bilobe shape is a duplicate of the upper side.

In the claims, the word "comprising" is used in its inclusive sense and does not exclude other elements being present. The indefinite articles "a" and "an" before a claim feature do not exclude more than one of the features being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A piston system, comprising:
    a first arm mounted on a first shaft for rotation about a central axis;
    a second arm mounted on a second shaft for rotation about the central axis;
    each of the first arm and the second arm terminating radially outward from the central axis in respective piston arrangements, each of the piston arrangements including a respective piston mounted for movement within a stationary chamber, said stationary chamber being defined at least in part by the piston of the first arm and the piston of the second arm;
    each of the first shaft and the second shaft being connected to an energy transfer mechanism; and
    the energy transfer mechanism including coupled non-circular gears arranged to convert oscillatory rotational motion to unidirectional rotational motion.

2. The piston system of claim 1 in which the pistons are mounted for circumferential movement and said stationary chamber extends circumferentially about the central axis.

3. The piston system of claim 1 in which each of the first arm and the second arm terminate radially outward from the central axis in partial gear pinion sections coupled to the respective piston arrangements, and said stationary chamber being a right-cylindrical stationary chamber.

4. The piston system of claim 3 in which the partial gear pinion sections are coupled to idler gears and the idler gears are further coupled to the respective piston arrangements, said stationary chamber being defined at least in part by a piston of the first arm and a piston of the second arm arranged so as to be directly opposed to each other.

5. The piston systems of claim 1 in which said stationary chamber is further defined by an engine block forming one half of said stationary chamber and a head forming the other half of said stationary chamber.

6. The piston system of claim 5 further comprising an intake port and an exhaust port for said stationary chamber.

7. The piston system of claim 6, in which the intake port and the exhaust port for said stationary chamber are located on a surface of said stationary chamber not defined by said pistons.

8. The piston system of claim 7, in which the intake port and the exhaust port for said stationary chamber are located on the engine block.

9. The piston system of claim 8, in which both the intake port and the exhaust port of said stationary chamber are equidistant from the piston of the first arm and the piston of the second arm defining at least in part said stationary chamber.

10. The piston system of claim 9, in which the intake port of said stationary chamber has a greater surface area than the exhaust port of said stationary chamber.

11. The piston system of claim 10, further comprising an intake valve associated with said intake port and an exhaust valve associated with said exhaust port.

12. The piston system of claim 11 in which said intake valve and said exhaust valve each comprises a poppet valve.

13. The piston system of claim 12 in which opening and closing of the intake valve and exhaust valve are controlled by a rotating cam plate.

14. The piston system of claim 1 further comprising an ignition mechanism for said stationary chamber.

15. The piston system of claim 1 in which the energy transfer mechanism comprises:
an energy transfer shaft;
a first central non-circular gear mounted for rotation about the central axis on the first shaft;
a second central non-circular gear mounted for rotation about the central axis on the second shaft; and
a gear stack comprising a first planetary non-circular gear meshed with the first central non-circular gear and a second planetary non-circular gear meshed with the second central non-circular gear; and
the first planetary non-circular gear and the second planetary non-circular gear being connected to the energy transfer shaft to rotate with the energy transfer shaft when the first planetary non-circular gear and the second planetary non-circular gear rotate with planetary revolution about the central axis.

16. The piston system of claim 15 further comprising:
a circular sun gear that is stationary with respect to the stationary chambers; and
the gear stack comprises a circular planetary gear mounted to revolve around the circular sun gear, the circular planetary gear being connected to the first planetary non-circular gear and the second planetary non-circular gear for planetary revolution with the first planetary non-circular gear and the second planetary non-circular gear to rotate and revolve with the first planetary non-circular gear and the second planetary non-circular gear as they revolve around the central axis.

17. The piston system of claim 16 in which the circular planetary gear is connected to the first planetary non-circular gear and the second planetary non-circular gear on a yoke and the yoke rotates with the energy transfer shaft.

18. The piston system of claim 15 further comprising a balancing gear stack mounted on a side of the central axis opposite to the gear stack.

19. The piston system of claim 18, in which the balancing gear stack comprises:
a first balancing planetary non-circular gear meshed to the first central non-circular gear;
a second balancing planetary non-circular gear meshed to the second central non-circular gear;
the first balancing planetary non-circular gear and the second balancing planetary non-circular gear being connected to the energy transfer shaft to rotate with the energy transfer shaft when the first balancing planetary non-circular gear and the second balancing planetary non-circular gear rotate with planetary revolution about the central axis;
a circular balancing planetary gear mounted to revolve around the circular sun gear, the circular balancing planetary gear being connected to the first balancing planetary non-circular gear and the second balancing planetary non-circular gear for planetary revolution with the first balancing planetary non-circular gear and the second balancing planetary non-circular gear to rotate and revolve with the first balancing planetary non-circular gear and the second balancing planetary non-circular gear as they revolve around the central axis;
the circular balancing planetary gear being connected to the first balancing planetary non-circular gear and the second balancing planetary non-circular gear on a yoke.

20. The piston system of claim 15, in which the gears have double helical teeth.

21. The piston system of claim 20, in which the first central, first planetary, second central and second planetary non-circular gears are bilobe gears and the first central bilobe gear and the second central bilobe gear are mounted so that a long axis of the first central bilobe gear is at 90 degrees to the long axis of the second central bilobe gear when the first arm and the second arm are perpendicular to each other.

22. The piston system of claim 15 in which the first central, first planetary, second central and second planetary non-circular gears are bilobe gears.

23. A piston system, comprising:
an arm mounted on a shaft for rotation about a central axis;
a piston arrangement coupled to a first end of the arm for circumferential movement about the central axis;
the piston arrangement being mounted for net-zero-motion circumferential oscillation within a stationary chamber that extends circumferentially about the central axis;
the shaft being connected to an energy transfer mechanism; and
the energy transfer mechanism including coupled non-circular gears arranged to convert oscillatory rotational motion to unidirectional rotational motion.

24. The piston system of claim 23 in which the piston arrangement comprises a pair of pistons facing in opposite directions.

25. The piston system of claim 24 further comprising the arm having a second end extending beyond the central axis in an opposite direction to the first end, the second end coupled to a second piston arrangement comprising a pair of pistons facing in opposite directions.

* * * * *